US006185224B1

(12) United States Patent
Limb et al.

(10) Patent No.: US 6,185,224 B1
(45) Date of Patent: Feb. 6, 2001

(54) SYSTEM AND METHOD FOR COMMUNICATING DATA IN A CABLE NETWORK

(75) Inventors: John O. Limb, Atlanta, GA (US); Dolors Sala, Norton, MA (US)

(73) Assignee: Georgia Tech Research Corporation, Atlanta, GA (US)

( * ) Notice: Under 35 U.S.C. 154(b), the term of this patent shall be extended for 0 days.

(21) Appl. No.: 09/228,852

(22) Filed: Jan. 12, 1999

Related U.S. Application Data (60) Provisional application No. 60/071,246, filed on Jan. 12, 1998.

(51) Int. Cl.[7] .................................................. H04L 12/43
(52) U.S. Cl. .......................... 370/459; 370/230; 370/438; 370/458
(58) Field of Search .................................... 370/230, 438, 370/442, 458, 459, 431, 463, 449, 451

(56) References Cited

U.S. PATENT DOCUMENTS

| 4,993,023 | | 2/1991 | Phinney ........................... 370/85.103 |
| 5,535,206 | * | 7/1996 | Bestler et al. .......................... 370/79 |
| 5,809,252 | | 9/1998 | Beighe, et al. ................. 395/200.57 |
| 5,850,400 | * | 12/1998 | Eames et al. .......................... 370/443 |
| 5,966,163 | * | 10/1999 | Lin et al. ............................... 348/12 |

OTHER PUBLICATIONS

Dail, et al., "Adaptive Digital Access Protocol: A MAC Protocol for Multiservices Broadband Access Networks, "IEEE Communictaion Magazine, Mar. 1996, pp. 104–112.
Gagen, et al., "Hybird Fiber–Coax Access Networks,"Bell Labs Technical Journal, Summer 1996, pp. 28–35.
Sala, et al., "Adaptive Control Mechanism for Cable Modem MAC Protocols,"pp. 1–28.
Limb, et al., "A Protocol for Efficient Transfer of Data Over Hybird Fiber/Coax Systems," IEEE/ACM Transaction on Networking, vol. 5, no. 6, Dec. 1997, pp. 872–881.
Citta, et al., "Phase 2 Simulation Results for Adaptive Random Access Protocol," Document No. IEEE 802.14/ 96–114, May 1, 1996, pp. 1–6.

\* cited by examiner

*Primary Examiner*—Huy D. Vu
*Assistant Examiner*—Dung Trinh
(74) *Attorney, Agent, or Firm*—Thomas, Kayden, Horstemeyer & Risley, L.L.P.

(57) ABSTRACT

The system of the present invention utilizes an interface unit and a controller located at a central cable station. The interface unit interfaces the controller with a cable connection, which connects the interface unit to a plurality of cable modems located at remote locations. The cable modems write transmission requests into slots that are defined by the controller as contention slots and that are communicated along a channel of the cable connection. The cable modems also write other data into slots that are defined by the controller as data slots and that are also communicated along the channel of the cable connection. The controller is configured to define certain ones of the slots communicated along the aforementioned channel as data slots and to allocate these data slots to particular ones of the cable modems in response to transmission requests received by the controller. The controller is preferably configured to define each slot not allocated to a particular cable modem as a contention slot. Furthermore, the controller is also configured to preselect certain ones of the data slots as contention slots such that preselected ones of the data slots are automatically defined as contention slots.

15 Claims, 7 Drawing Sheets

SYSTEM AND METHOD FOR COMMUNICATING DATA IN A CABLE NETWORK

CROSS REFERENCE TO RELATED APPLICATION

This document claims priority to and the benefit of the filing date of copending provisional application entitled "CONTENTION SLOT ALLOCATOR FOR A CABLE MODEM," assigned Ser. No. 60/071,246 and filed Jan. 12, 1998, which is hereby incorporated by reference.

BACKGROUND OF THE INVENTION

1. Field of the Invention

The present invention generally relates to data communication and, in particular, to a system and method for increasing the efficiency of data communication in a cable network.

2. Related Art

The cable television industry currently transmits television signals through a cable network utilizing a combination of optical fibers and coaxial cables. This cable network is sometimes referred to as a hybrid fiber coaxial (HFC) network. In addition to the transmission of television signals, it has been recognized that the cable network can also be used to transmit other types of data between remote locations. Therefore, the cable network of the cable industry may be used as an alternative to communicating data via conventional telephone networks, such as the public switched telephone network (PSTN).

In this regard, the cable network is currently being used to transmit data to and from subscribers located at remote locations. Each subscriber location includes a cable modem capable of communicating with a controller located at a central cable station (or "head-end") that provides television signals to each subscriber modem. Cable connections between the controller at the central cable station and the subscriber modems currently exist so that movies or other types of television signals can be transmitted from the central cable station to each of the subscriber modems.

Each connection between a subscriber modem and the central cable station includes two channels, an upstream channel having one frequency range and a downstream channel having another frequency range. The upstream channel is used to transmit data from the subscriber modems to the controller at the central cable station, and the downstream channel is used to transmit data from the central cable station to the subscriber modems.

A medium access control (MAC) protocol has been devised to enable reliable communication of data across both channels of each cable connection. The MAC protocol establishes frames of information slots that are used to communicate data over the cable connections. According to one embodiment of the MAC protocol, each information slot represents a sixteen byte data packet in a data stream flowing between the central cable station and the subscriber modems via the cable connections of the cable network. Furthermore, pursuant to MAC protocol, each subscriber modem can write to the upstream channel but cannot read from it, and each subscriber modem can read from the downstream channel but cannot write to it. The MAC protocol and transmission of data via slots are well known in the art.

Since the controller at the central cable station is the only device transmitting on the downstream channel, the controller has complete access to the downstream channel. Therefore, steps do not need to be taken to ensure that data transmitted by the controller is not overwritten as a result of multiple devices trying to communicate on the same channel. However, since each of the cable modems transmit on the upstream channel, access to the upstream channel should be controlled to ensure data reliability.

To enable orderly access to the upstream channel, the controller communicates control signals to the subscriber modems via the downstream channel indicating when and what type of information each subscriber modem may communicate on the upstream channel. In this regard, the controller defines each slot within each frame on the upstream channel as either a contention slot or a data slot. The controller notifies each subscriber modem via the downstream channel of when the contention slots are present on the upstream channel such that any of the subscriber modems can write to any of the contention slots.

When a subscriber modem has data that it wishes to transmit on the upstream channel, the subscriber modem waits for the next contention slot and writes a transmission request into the contention slot when the contention slot arrives at the subscriber modem. This transmission request is transmitted by the upstream channel to the controller, which allocates a certain number of data slots to the requesting subscriber modem in response to the transmission request. The controller then informs the requesting subscriber modem when these data slots will arrive on the upstream channel so that the requesting subscriber modem may write its data into the allocated slots. The controller allocates each data slot to only one subscriber modem so that only one subscriber modem writes data to a single data slot. This prevents subscriber modems from writing over data previously written into the data slots by other subscriber modems.

A problem with the current protocol of communicating across the cable connections of a cable network is that delays exist between the time that a subscriber modem is ready to communicate data and the time that the subscriber modem is actually allowed to write data into data slots on the upstream channel. This delay is exacerbated by the fact that many transmission requests are overwritten by other subscriber modems and are, therefore, not successfully communicated to the central cable station.

In this regard, each cable modem in the cable network is allowed to write a transmission request to any of the contention slots pursuant to MAC protocol. Accordingly, when multiple cable modems write transmission requests to the same contention slot, the contention slot becomes unreadable at the central cable station. As a result, none of the transmission requests written into the contention slot are serviced by the controller at the central cable station. Therefore, each of the transmission requests written into the same contention slot is later retransmitted via another contention slot, thereby delaying the process of receiving an authorization to communicate on the upstream channel.

Thus, a heretofore unaddressed need exists in the industry for providing a system and method for reducing the delays associated with the allocation of data slots within a cable network to increase the efficiency of the cable network.

SUMMARY OF THE INVENTION

The present invention overcomes the inadequacies and deficiencies of the prior art as discussed hereinbefore. Generally, the present invention provides a system and method for efficiently defining and allocating slots communicated within a cable network.

The present invention utilizes an interface unit and a controller located at a central cable station. The interface unit interfaces the controller with a cable connection, which connects the interface unit to a plurality of cable modems located at remote locations. The cable modems write transmission requests into slots that are defined by the controller as contention slots and that are communicated along a channel of the cable connection. The cable modems also write other data into slots that are defined by the controller as data slots and that are also communicated along the channel of the cable connection. The controller is configured to detect new transmission requests that have been written into the contention slots. If any new transmission requests are currently detected, then the controller defines the next available slot as a data slot and transmits control signals to one of the cable modems allocating this data slot to the one cable modem. If no new transmission requests currently exist, then the controller transmits control signals to each of the cable modems defining the next available slot as a contention slot.

In accordance with another feature of the present invention, particular ones of the slots communicated via the channel of the cable connection are preselected as contention slots. The particular ones preselected as contention slots can be selected from a predefined pattern of slots.

The present invention can also be viewed as providing a communication method. Briefly described, the communication method can be broadly conceptualized by the following steps: communicating slots across a cable connection; receiving transmission requests from cable modems coupled to the cable connection; determining whether each of the transmission requests has been fully serviced; defining a portion of the slots as data slots; defining at least one of the slots as a contention slot in response to a determination that all of the transmission requests have been fully serviced; and preselecting at least one of the slots as a contention slot.

The present invention has many advantages, a few of which are delineated hereafter, as mere examples.

An advantage of the present invention is that delays associated with communication in the cable network are reduced.

Another advantage of the present invention is that the efficiency of the cable network is increased.

Another advantage of the present invention is that each slot not allocated to a particular modem in response to a transmission request can be defined as a contention slot.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
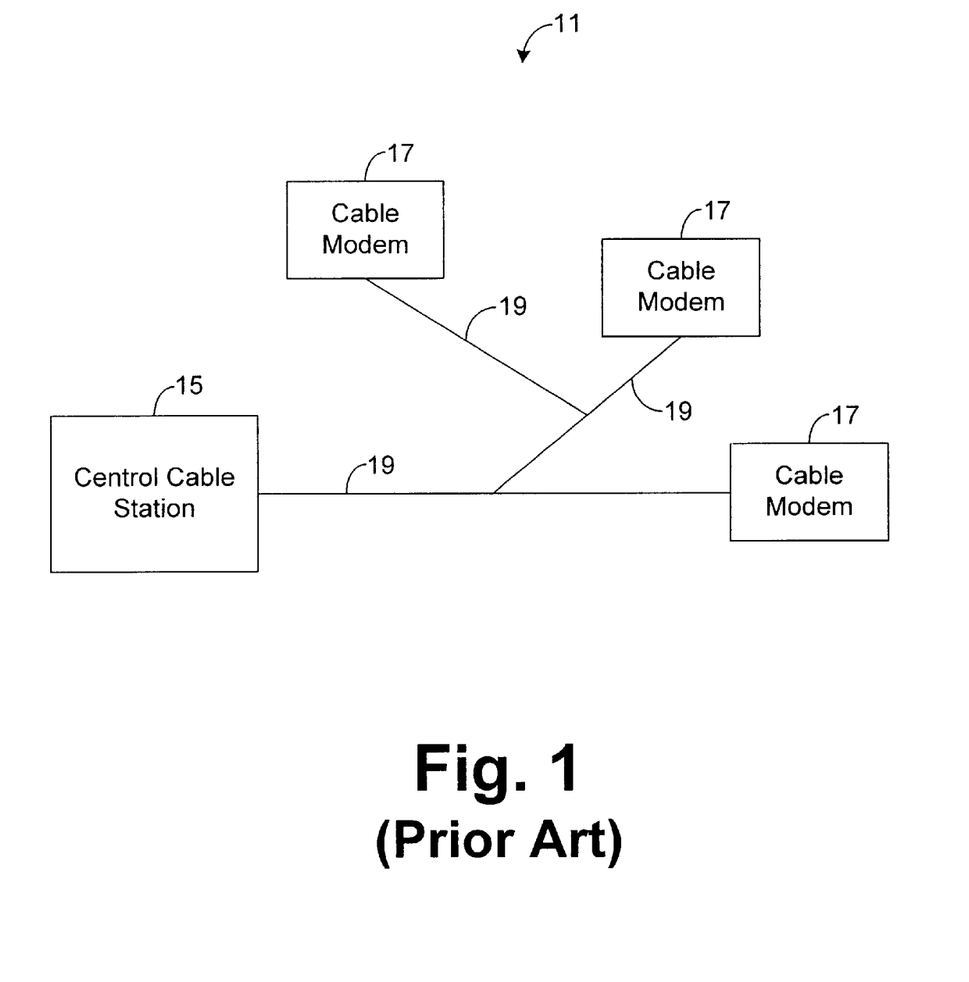
FIG. 1 is a diagram illustrating a conventional cable network.

FIG. 1 depicts a conventional cable network 11. As known in the art, a central cable station 15 is connected to a plurality of cable modems 17 via cable connection 19. Each of the cable modems 17 is usually located at a remote location (e.g., at a subscriber's premises). Cable 19 typically includes segments of optical fibers and coaxial cables. Therefore, network 15 is often referred to as a hybrid fiber coax (HYC) network.

Figure 2:
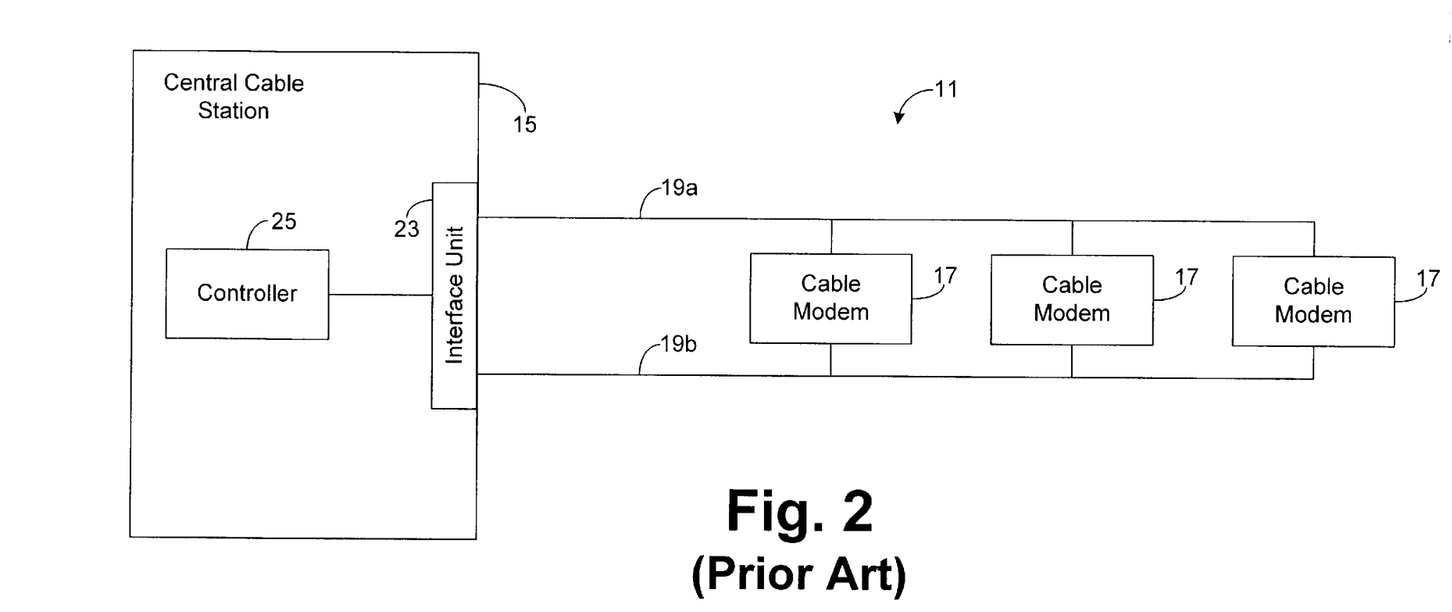
FIG. 2 is a diagram illustrating a more detailed view of the cable network depicted in FIG. 1.

As shown by FIG. 2, cable 19 usually includes a downstream channel 19a and an upstream channel 19b. Data is communicated from the central cable station 15 to the cable modems 17 via the downstream channel 19a, and data is communicated from the modems 17 via the upstream channel 19b. The term "data" refers to any information that may be communicated with any of the modems 17. To communicate data between modems 17, data is usually first communicated to the central cable station 15 from a transmitting modem 17 via the upstream channel 19b. Then, the data is transmitted from the central cable station 15 to a receiving modem 17 via downstream channel 19a.

Since a plurality of modems 17 transmit across the same channel 19b, it is important to ensure that data written on the upstream channel 19b by one modem 17 does not overwrite data previously written on the upstream channel 19b by another modem 17. Therefore, medium access control (MAC) protocol has been established to enable the orderly communication of data on the cable 19.

In this regard, the upstream channel 19b includes a stream of slots communicated serially through the cable 19. Each slot usually includes sixteen bytes of information, although other amounts for each slot may be used. The central cable station 15 includes an interface unit 23 and a controller 25. The interface unit 23 interfaces the controller 25 with the data communicated by cable 19. The controller 25 controls what type of information may be written into each slot.

Figure 3:
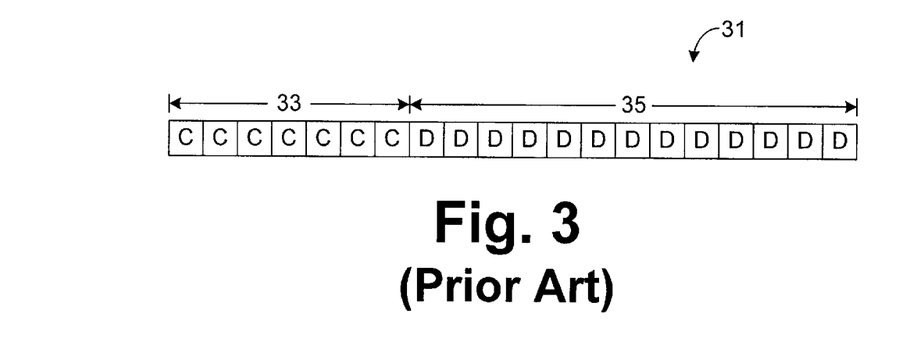
FIG. 3 is a diagram illustrating a frame of data communicated via an upstream channel of the cable network depicted in FIG. 2.

To this end, the controller 25 classifies each slot as either a data slot or a contention slot. As an example, FIG. 3 shows an exemplary frame 31 of data that is communicated via the upstream channel 19b. The frame 31 depicted by FIG. 3 includes twenty slots although other numbers of slots may be used. In fact, existing implementations of network 11 usually define the size of frame 31 to be large enough so that the time required to transmit one frame 31 is greater than the time required for one packet to travel from a subscriber modem 17 to the central cable station 15 and back to the subscriber modem 17 plus the amount of time required to process a transmission request at the controller 25. See, e.g., Citta et al., "Phase 2 Simulation Results for Adaptive Random Access Protocol," contribution to the IEEE802.14 WG, No. 802.14/96–114, May 1, 1996, which is incorporated herein by reference. In FIG. 3, the slots defined by the controller 25 as contention slots are identified by a "c," and the slots defined by the controller 25 as data slots are identified by a "d." The controller 25 transmits timing information via control signals on the downstream channel 19a defining whether each slot on channel 19b is a contention slot or a data slot. Therefore, based on the control signals, each modem 17 determines when it can write onto channel 19b.

To ensure that only one modem 17 writes to a single data slot, the controller 25 allocates each data slot to a maximum of one modem 17. Once the controller 25 determines that a data slot is allocated to a particular modem 17, the controller 25 transmits control signals to the particular modem 17 via downstream channel 17b indicating when the particular modem 17 can write data into the allocated data slot. In other words, the control signals indicate when the data slot allocated to the particular modem 17 passes the particular modem 17, thereby enabling the particular modem to write data into the allocated data slot. Based on these control signals, the particular modem 17 waits on the allocated data slot and writes data into the allocated data slot when the allocated data slot passes the particular modem 17.

The controller 25 also transmits control signals to the modems 17 via downstream channel 19a to enable the modems 17 to determine when a contention slot is passing each respective modem 17. The contention slots are used by the modems 17 to transmit transmission requests to the controller 25. A transmission request is a request by one of the modems 17 for the controller 25 to allocate a number of data slots to the modem 17 so that the modem 17 can transmit data via the allocated data slots.

Therefore, when a modem 17 is ready to transmit data to the central cable station 15, the modem 17 waits for a contention slot. The modem 17 is aware of the next opportunity to write to a contention slot based on the control signals provided by the controller 25. When the next opportunity to write to a contention slot becomes available (i.e., when the next contention slot passes the modem 17), the modem 17 writes a transmission request into the contention slot. The transmission request indicates the number of data slots needed by the requesting modem 17 (i.e., the modem 17 that wrote the transmission request into the contention slot) to transmit its data.

If no other modems 17 write to the same contention slot, then the controller 25 is able to detect the transmission request by reading the contention slot once it is received by the controller 25 via the interface unit 23. In response, the controller 25 allocates certain data slots (usually contiguous data slots, but not necessarily) to the requesting modem 17 so that the requesting modem 17 may write its data in the allocated data slots.

In this regard, information identifying the allocated data slots is transmitted to the requesting modem 17 via control signals on the downstream channel 19a. This information authorizes the requesting modem 17 to write data to the allocated data slots and enables the requesting modem 17 to determine when to write data onto the channel 19b such that the data is written into the allocated data slots. Since no other modem 17 receives authorization to write to these allocated data slots, only the requesting modem 17 writes to the allocated data slots. As a result, the data written by the requesting modem 17 into the allocated data slots should not be overwritten by other modems 17.

However, any modem 17 may write a transmission request to any contention slot. Therefore, it is possible for another modem 17 to write a transmission request to the same contention slot. If this occurs, the data received by the controller 25 in the contention slot is unintelligible to the controller 25, and the controller 25, therefore, does not allocate data slots to the requesting modem 17. After a predetermined amount of time has expired without receiving an authorization from the controller 25 to write data or an acknowledgment that the controller 25 has received the transmission request, the requesting modem 17 resubmits another transmission request by writing another transmission request into another contention slot. This process repeats until the requesting modem 17 is allocated the requested number of data slots and receives authorization to write into these data slots.

As can be appreciated by one ordinarily skilled in the art, the ratio of contention slots to data slots being communicated via upstream channel 19b is important. If too few contention slots are utilized, then it is likely that a significant number of transmission requests will be overwritten. Therefore, the number of unsuccessful transmission requests is increased, thereby increasing the delay associated with receiving an authorization to write data to the data slots on the channel 19b. Conversely, if too many contention slots are utilized such that a significant number of contention slots are empty (i.e., do not include a transmission request), then resource waste occurs since many of the empty contention slots could have been used as data slots to transmit data. As a result, the efficiency of the network 11 is not maximized.

There are many techniques for determining how many of the slots within each frame 31 should be defined as contention slots and how many should be defined as data slots. However, most conventional networks 11 utilize framing techniques in defining the slots on channel 19b. In other words, which slots in frame 31 that are to be defined as contention slots and which slots that are to be defined as data slots are predetermined (i.e., are determined before any slots of the frame 31 appear on the upstream channel 19b). See, e.g., Citta, supra.

Furthermore, as shown by FIG. 3, each frame 31 is usually comprised of a block 33 of contention slots and a block 35 of data slots. As used herein, the term "block" shall refer to contiguous slots of the same type. For example, block 33 includes contiguous contention slots, and block 35 includes contiguous data slots.

As the communication on the network 11 progresses, the number of contention slots per frame 31 may be reevaluated and changed. There are various techniques for determining the contention slot-to-data slot ratio for each frame. In one example embodiment, if a significant number of transmission requests are being overwritten, the controller 25 determines that there are not enough contention slots and increases the number of contention slots in each frame 31. If a significant number of requests for data are empty, then the controller 25 determines that there are too many contention slots and reduces the number of contention slots in each frame. Although most controllers 25 usually implement these changes in the next frame 31 to be communicated on channel 19b, a delay usually exists before the effects of these changes are realized. This delay results from the fact that transmission of the next frame 31 does not begin until each slot of the current frame 31 appears on the channel 19b, and this delay can be relatively significant considering that most conventional techniques utilize relatively long frames 31.

Figure 4:
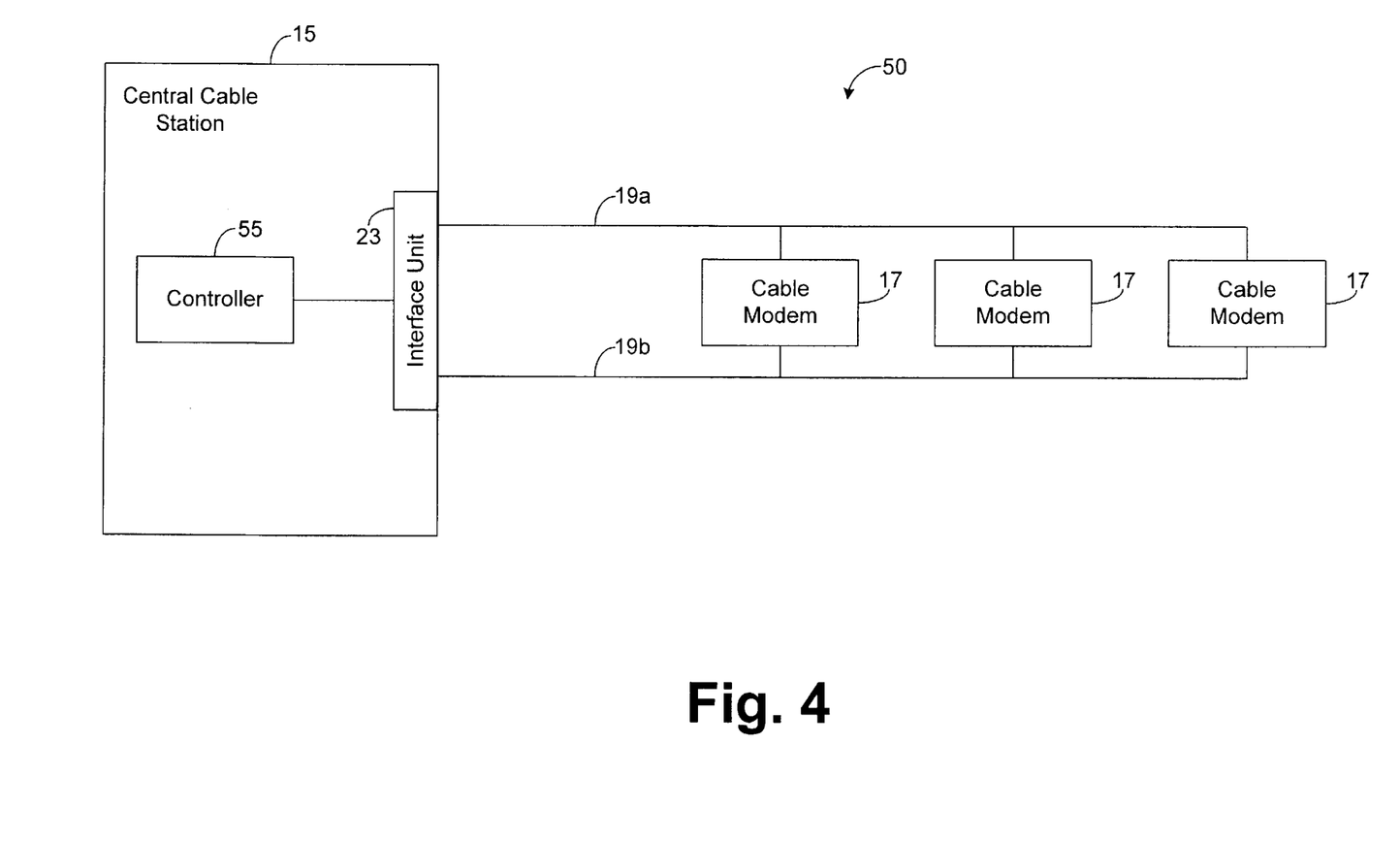
FIG. 4 is a diagram illustrating a cable network system in accordance with the present invention.

In general, the present invention provides a cable network system 50 that reduces communication delays and, therefore, maximizes the efficiency of communication through the network system 50. Referring to FIG. 4, the network system 50 of the present invention is configured similar to the conventional cable network 15 except that controller 55 defies or labels the slots of upstream channel 19b differently than controller 25 (FIG. 2).

The controller 55 of network system 50 can be implemented in software, hardware, or a combination thereof. In the preferred embodiment, as illustrated by way of example in FIG. 5, the controller 55 of the present invention along with its associated methodology is implemented in software and stored in computer memory 57 of a computer system 58.

Note that the controller 55, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the controller 55 may be magnetically stored and transported on a conventional portable computer diskette.

Figure 5:
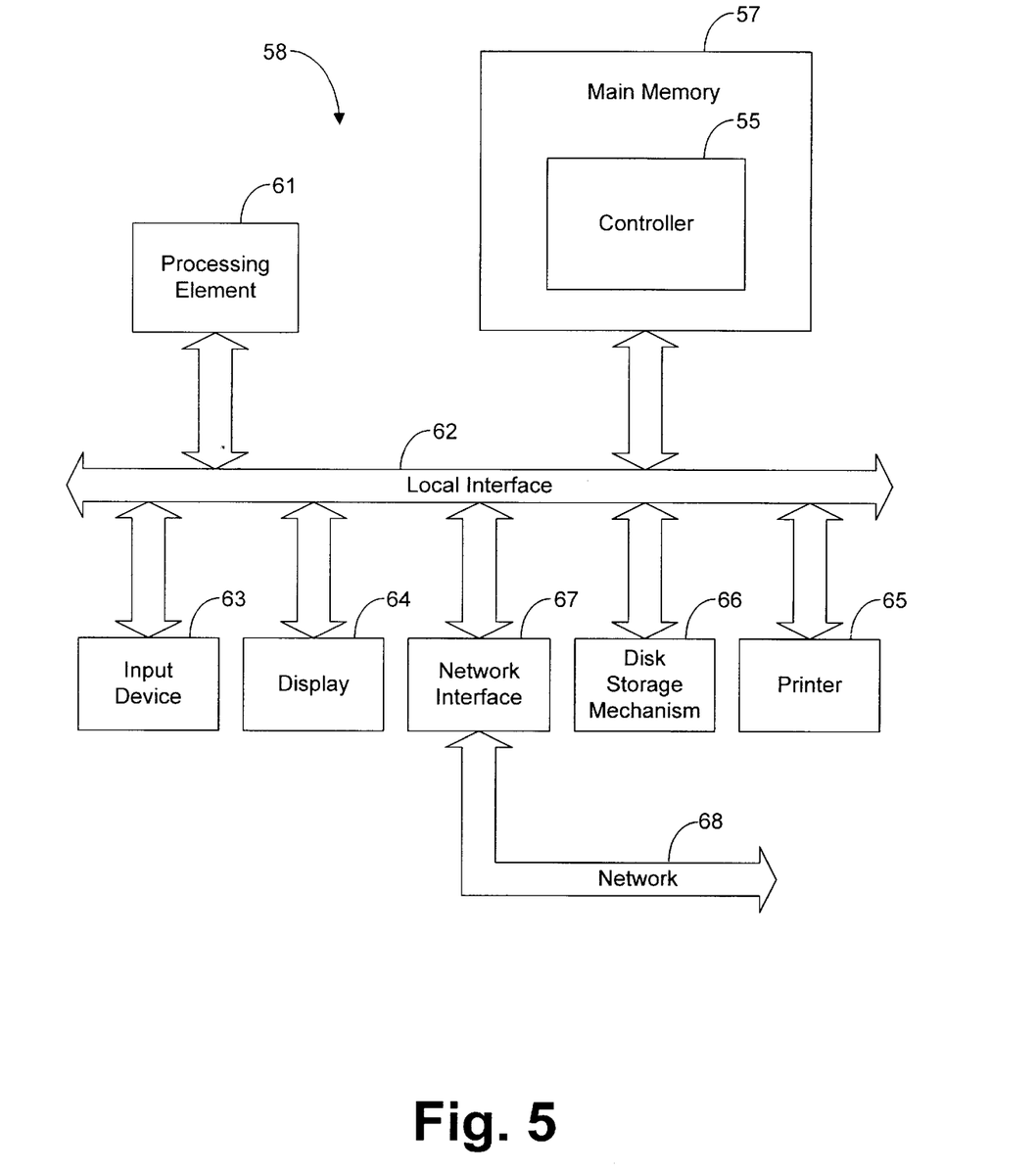
FIG. 5 is a diagram illustrating a computer system implementing a controller of the cable network system depicted in FIG. 4.

The preferred embodiment of the computer system 58 of FIG. 5 comprises one or more conventional processing elements 61, such as a digital signal processor (DSP), that communicate to and drive the other elements within the system 58 via a local interface 62, which can include one or more buses. Furthermore, an input device 63, for example, a keyboard or a mouse, can be used to input data from a user of the system 58, and screen display 64 or a printer 65 can be used to output data to the user. A disk storage mechanism 66 can be connected to the local interface 62 to transfer data to and from a nonvolatile disk (e.g., magnetic, optical, etc.). The system 58 can be connected to a network interface 67 that allows the system 58 to exchange data with a network 68. It should be noted that input device 63, display 64, printer 65, disk storage mechanism 66, network interface 67, and network 68 are optional and are not a part of the preferred embodiment, although other embodiments may include these features.

The controller 55 is preferably configured to define each slot of the upstream channel 19b as a contention slot unless the controller 55 allocates the slot as a data slot to one of the modems 17. In other words, the controller 55 does not estimate the number of slots that should be defined as contention slots. Instead, the controller 55 defines every slot as a contention slot unless the slot is used to satisfy a transmission request from one of the modems 17.

In this regard, in response to receiving a transmission request, the controller 55 is configured to define a number of slots as data slots and to authorize the requesting modem 17 (i.e., the modem 17 that transmitted the transmission request) to write into these data slots. The number of data slots defined and allocated to the requesting modem 17 corresponds to the number of data slots requested by the transmission request. Therefore, each data slot defined and allocated in response to the transmission request is utilized by the requesting modem 17 to transmit data to the central cable station 15. Since the controller 55 defines slots as data slots in response to transmission requests, each slot communicated on upstream channel 19b is either a contention slot or is a data slot written to by one of the modems 17. None of the slots on upstream channel 19b is an empty data slot. Therefore, the efficiency of the network system 50 is increased, and the amount of delays are reduced.

As a result of defining the slots of the upstream channel 19b according to the aforementioned techniques of the present invention, the defining of data slots often occurs in bursts. In this regard, when a large number of transmission requests are successfully received by the controller 55, a large number of slots are defined and allocated as data slots by the controller 55. Therefore, the number of slots defined as contention slots is reduced causing overwrites to the contention slots to occur more frequently. This results in fewer transmission requests being successfully received by the controller 55. As a result, fewer slots are defined and allocated as data slots causing the number of slots defined as contention slots to increase. Once this occurs, a large number of transmission requests can again be successfully received by the controller 55 causing the aforementioned pattern to repeat.

Figure 6:
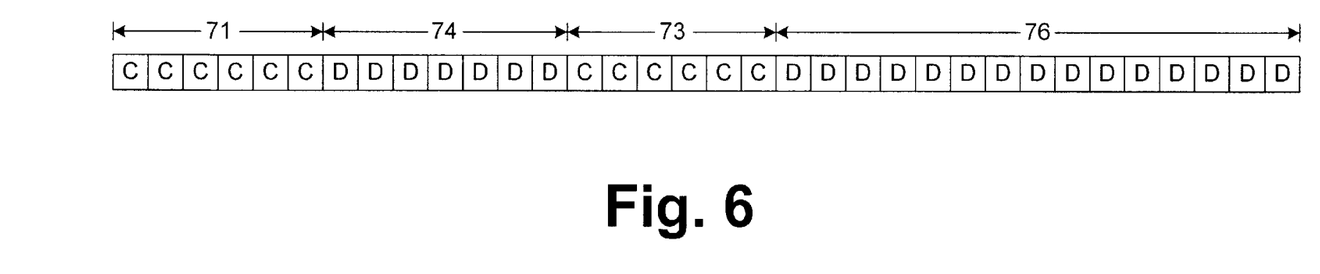
FIG. 6 is a diagram illustrating a sequence of slots communicated via an upstream channel of the cable network system depicted in FIG. 4.

Consequently, the labeling of the slots on channel 19b tends to be cyclical. In this regard, a relatively large number of successive slots are defined as contention slots followed by a relatively large number of successive slots defined as data slots. As an example, refer to FIG. 6 which depicts a plurality of successive slots defined in accordance with the techniques of the first embodiment described hereinabove. As can be seen by referring to FIG. 6, the labeling of slots is likely to be cyclical in that a successive number of contention slots is likely to be followed by a successive number of data slots and vice versa. Thus, there is a natural tendency for the slots on channel 19b to be transmitted in relatively large blocks 71 and 73 of contiguous contention slots followed by relatively large blocks 74 and 76 of contiguous data slots, similar to many conventional framing techniques. This increases the delay of the system 50 because if a modem 17 needs to transmit a transmission request when a relatively large block 74 or 76 of data slots is currently on the channel 17, the amount of time that the modem 17 waits for a contention slot is increased.

It has been discovered that the delays caused by the cyclical pattern described hereinabove can be reduced, and the efficiency of the network system 50 can be improved by periodically forcing or predefining a small number of slots to be contention slots. For example, the controller 55 can be configured to define every $9^{th}$ and $10^{th}$ slot as a contention slot. Therefore, every $9^{th}$ and $10^{th}$ slot is automatically defined as a contention slot. In other words, every $9^{th}$ and $10^{th}$ slot is defined as a contention slot without determining whether the $9^{th}$ and $10^{th}$ slots could be used as data slots to satisfy a received transmission request.

Figure 7:
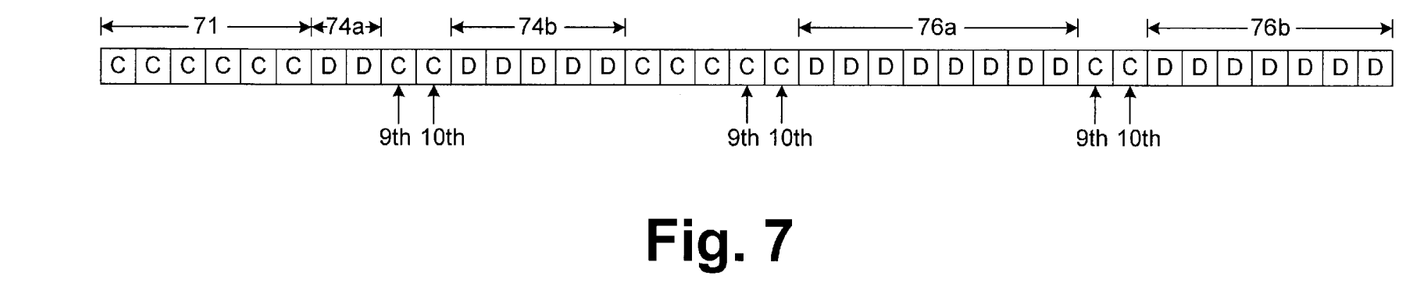
FIG. 7 is a diagram illustrating another sequence of slots communicated via the upstream channel of the cable network system depicted in FIG. 4, when certain slots have been predefined as contention slots.

As a result, the cyclical pattern is interrupted (i.e., relatively large blocks 74 and 76 of data slots are separated by preselected contention slots into smaller blocks 74a, 74b, 76a, and 76b of data slots), as shown by FIG. 7, and the delay associated with the cyclical pattern is thereby reduced. It should be noted in viewing FIG. 7, that the data slots in blocks 74a and 74b correspond to the data slots in block 74 of FIG. 6 and that the data slots in blocks 76a and 76b correspond to the data slots in block 76 of FIG. 6.

It should be noted that instead of predefining every $9^{th}$ and $10^{th}$ slot as contention slots, the controller 55 can be configured to predefine other patterns of slots as contention slots. In this regard, any pattern that helps to interrupt a relatively large number of sequential data slots is generally desirable and increases the efficiency of the system 50.

OPERATION

The preferred use and operation of the system 50 and associated methodology are described hereafter.

Figure 8:
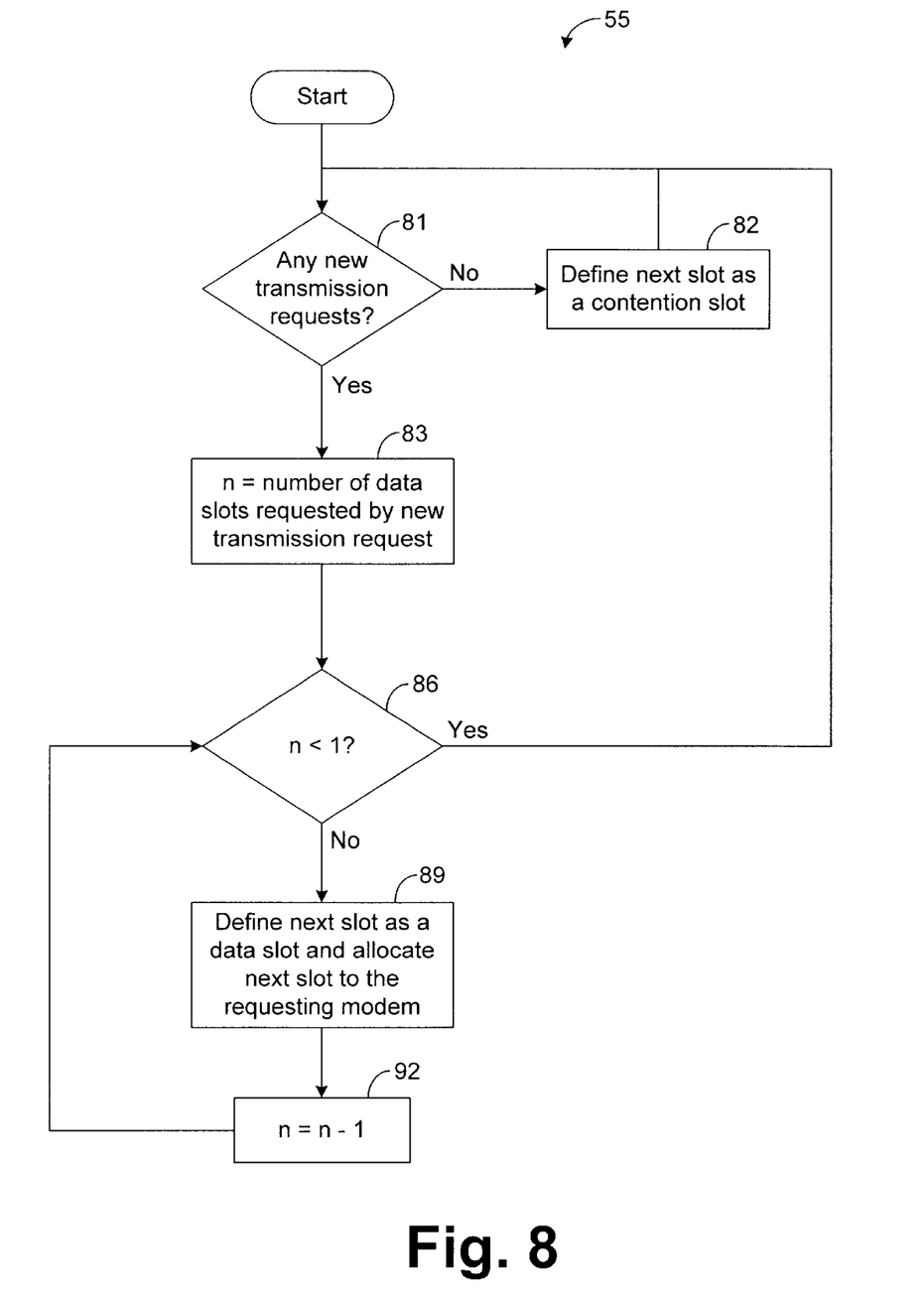
FIG. 8 is a flow chart illustrating the architecture and functionality of the cable network system depicted in FIG. 4 according to a first embodiment of the present invention.

FIG. 8 depicts the architecture and functionality of the first embodiment of the controller 55. The controller 55 periodically defines or labels each slot of the data stream being communicated by upstream channel 19b. Each slot is defined by the controller 55 before the slot appears on the channel 19b. Before defining the next slot to be defined, the controller 55 first determines at step 81 whether any new transmission requests have been received from any of the modems 17. A "new transmission request" is any transmission request that has been successfully received by the controller 55 but has not been fully serviced by the controller 55. A transmission request is "fully serviced" when the controller 55 has defined and allocated the requested number of data slots to the requesting modem 17 (i.e, the modem 17 that transmitted the transmission request) in response to the transmission request.

If no new transmission request exists, the controller 55 defines the next slot to be defined as a contention slot, as shown by step 82. Therefore, the controller 55 transmits control signals to each modem 17 via downstream channel 19a indicating that the next slot is a contention slot. Therefore, when the next slot appears on the channel 19b, any of the modems 17 can write a transmission request into this slot.

If a new transmission request exists at step 81, then the controller 55 defines the next slot as a data slot, as shown by steps 83–92. Therefore, the controller 55 transmits control signals to the requesting modem 17 that submitted the transmission request. The control signals indicate that the next slot has been defined as a data slot and has been allocated to the requesting modem 17. This enables the requesting modem 17 to write data into the next slot when this slot appears on the channel 19b. This process of defining the next slot as a data slot and allocating the next slot to the requesting modem 17 repeats until enough slots have been defined and allocated to satisfy the transmission request. Once the transmission request is satisfied, the controller 55 returns to step 81 and repeats the aforementioned process.

It should be noted that the controller 55 can be configured to notify requesting modem 17 of the allocated data slots in a variety of ways. For example, the controller 55 can be configured to transmit control signals after a slot is allocated to the requesting modem 17, or the controller 55 can be configured to wait until each slot associated with a new transmission request has been allocated to the requesting modem 17 before transmitting the control signals.

Any methodology for indicating which slots have been allocated to a requesting modem 17 is suitable for the purposes of the present invention.

As a result of the aforementioned process, each slot on channel 19b is either defined as a data slot and allocated to a particular modem 17 or is defined as a contention slot. There should be no empty data slots on channel 19b. Therefore, the allocation of the slots is more efficient, and delay time for processing transmission requests is reduced.

Figure 9:
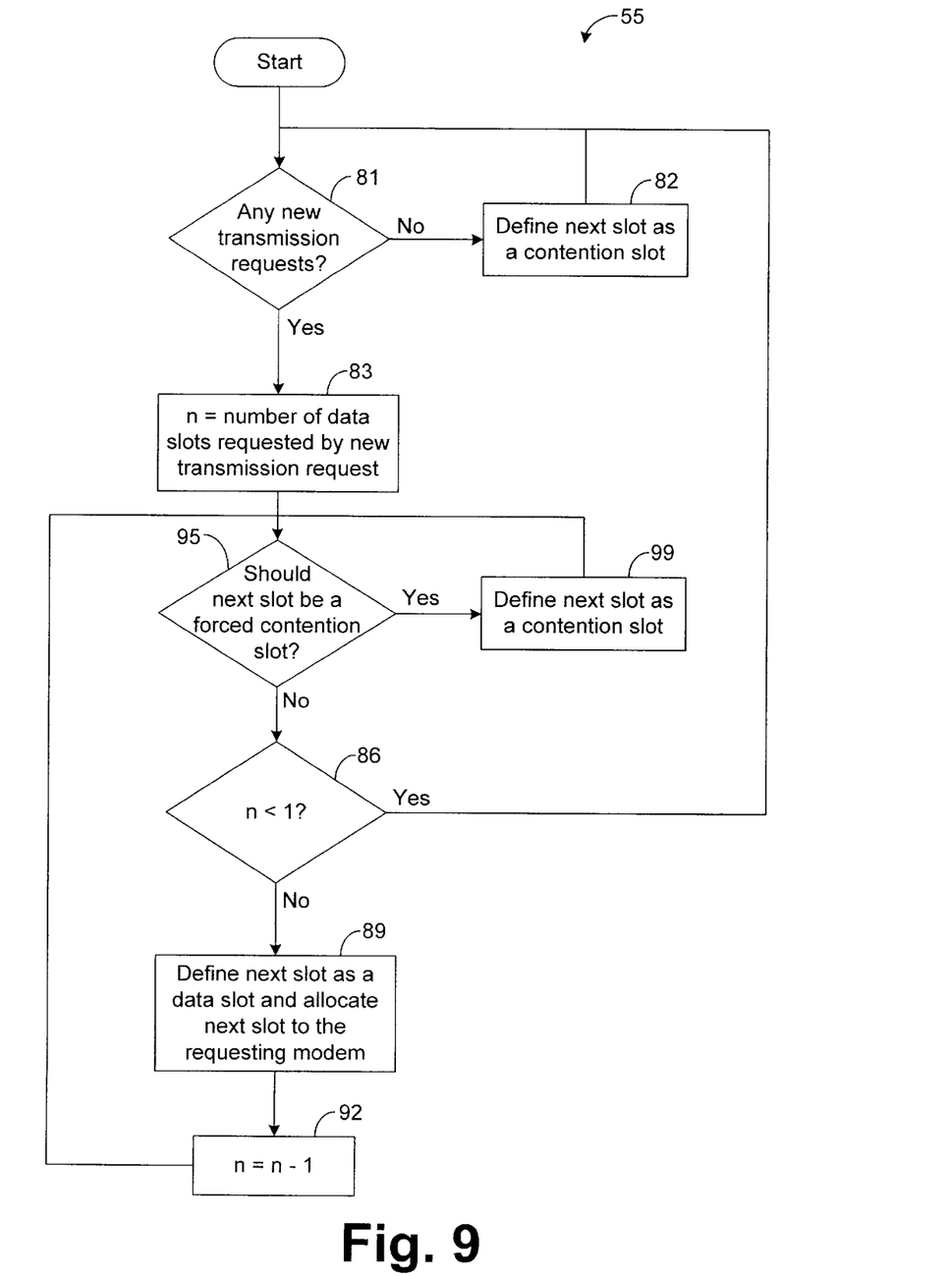
FIG. 9 is a flow chart illustrating the architecture and functionality of the cable network system depicted in FIG. 4 according to a second embodiment of the present invention.

FIG. 9, depicts another embodiment of the present invention, wherein a predetermined pattern of slots are automatically defined as contention slots. These slots are referred to herein as "forced contention slots." In the embodiment depicted by FIG. 9, the controller 55 operates similar to the controller 55 of the first embodiment except that the forced contention slots are automatically defined as contention slots regardless of the existence of any new transmission requests. Therefore, when the controller 55 determines that a new transmission request needs to be serviced, the controller 55 first determines whether the next slot has been preselected as a forced contention slot, as shown by step 95.

If the next slot has been preselected as a forced contention slot, then the next slot is defined as a contention slot, as depicted by step 99. However, if the next slot has not been preselected as a forced contention slot, then the next slot is defined as a data slot, as shown by steps 83–92. By forcing certain slots to be contention slots, the number of slots sequentially defined as data slots can be controlled and reduced. Furthermore, reducing the number of slots sequentially defined as data slots can reduce the overall delay associated with the network system 50.

It should be noted that it is possible to define some of the slots on the upstream channel 19b as data slots without allocating them to any of the modems 17. In other words, it is possible for empty data slots to exist on channel 19b without departing from the principles of the present invention. As an example, the controller 55 may be modified to define more slots as data slots than what is needed to service all of the transmission requests, or the controller 55 may be modified to automatically define (or preselect) some of the slots as data slots. As a result, some data slots can be defined and not allocated to any of the modems 17, and these data slots, therefore, remain empty as they are transmitted on channel 19b. However, allowing empty data slots to exist on channel 19b generally reduces the overall efficiency of the system 50 and is, therefore, not generally desirable.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A system for communicating data with cable modems, comprising:

an interface unit coupled to a cable connection, said interface unit receiving slots being communicated across said cable connection; and a controller coupled to said interface unit, said controller configured to detect new transmission requests and to transmit control signals, said controller further configured to define via said control signals at least one of said slots being communicated across said cable connection as a data slot in response to a detection of a new transmission request, said controller further configured to define via said control signals another one of said slots being communicated across said connection as a contention slot in response to an absence of new transmission requests, said controller further configured to preselect a particular one of said slots as a contention slot.

2. The system of claim 1, wherein said particular one is selected from a pattern defining slots that are automatically selected as contention slots.

3. The system of claim 1, wherein said controller is further configured to allocate said data slot to one of said cable modems.

4. The system of claim 1, wherein said controller is further configured to allocate each of said data slots to a respective one of said cable modems.

5. The system of claim 1, wherein said controller is further configured to allocate said data slots to said cable modems and to define each of said slots being communicated across said cable connection as a contention slot unless said each slot is allocated to a respective one of said cable modems.

6. A communication method, comprising the steps of:

communicating slots across a cable connection;

receiving transmission requests from cable modems coupled to said cable connection;

determining whether each of said transmission requests has been fully serviced;

defining a portion of said slots as data slots;

defining at least one of said slots as a contention slot in response to a determination that all of said transmission requests have been fully serviced; and preselecting at least one of said slots as a contention slot.

7. The method of claim 6, further comprising the step of defining at least one of said slots as a data slot in response to a determination that at least one of said transmission requests has not been fully serviced.

8. The method of claim 6, further comprising the step of predefining a pattern of said slots as contention slots.

9. The method of claim 8, further comprising the step of defining each of said slots outside of said pattern and said portion as a contention slot.

10. The method of claim 9, further comprising the step of allocating each of said data slots to a respective cable modem.

11. A communication method, comprising the steps of:

communicating slots across a cable connection;

receiving transmission requests from cable modems coupled to said cable connection;

determining whether each of said transmission requests has been fully serviced;

defining a portion of said slots as data slots;

defining at least one of said slots as a contention slot in response to a determination that said transmission requests have been fully serviced; and automatically defining at least one of said slots as a contention slot.

12. The method of claim 11, further comprising the step of defining at least one of said slots as a data slot in response to a determination that at least one of said transmission requests has not been fully serviced.

13. The method of claim 11, further comprising the step of predefining a pattern of said slots as contention slots.

14. The method of claim 13, further comprising the step of defining each of said slots outside of said pattern and said portion as contention slots.

15. The method of claim 14, further comprising the step of allocating each of said data slots to a respective cable modem.

* * * * *